US012725047B2

(12) United States Patent
Lee et al.

(10) Patent No.: US 12,725,047 B2
(45) Date of Patent: Sep. 1, 2026

(54) SYSTEM AND METHOD FOR DEFECT CLASSIFICATION AND LOCALIZATION WITH SELF-SUPERVISED PRETRAINING

(71) Applicant: Hong Kong Applied Science and Technology Research Institute Company Limited, Hong Kong (HK)

(72) Inventors: Hon Chung Lee, Hong Kong (HK); Jiayu Shu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 820 days.

(21) Appl. No.: 18/167,881

(22) Filed: Feb. 12, 2023

(65) Prior Publication Data

US 2024/0273374 A1 Aug. 15, 2024

(51) Int. Cl.
*G06N 3/0895* (2023.01)

(52) U.S. Cl.
CPC .................................. *G06N 3/0895* (2023.01)

(58) Field of Classification Search
CPC ...... G06N 3/0895; G06N 3/045; G06N 3/088; G06V 10/764
See application file for complete search history.

(56) References Cited

U.S. PATENT DOCUMENTS 9,964,607 B1 5/2018 Propes et al.
10,839,506 B1 11/2020 Raghu et al.
11,227,378 B2 1/2022 Burkhardt et al.
2018/0322623 A1* 11/2018 Memo ...................... G06N 3/09
2022/0036525 A1* 2/2022 Xin ...................... G06V 10/772
2022/0156521 A1 5/2022 Sohn et al.

FOREIGN PATENT DOCUMENTS

CN 110197259 A 9/2019
CN 112446429 A 3/2021
CN 112991330 A 6/2021
CN 113643224 A 11/2021

(Continued)

OTHER PUBLICATIONS

Li, "CutPaste: Self-Supervised Learning for Anomaly Detection and Localization", 2021 (Year: 2021).*

(Continued)

*Primary Examiner* — Usmaan Saeed
*Assistant Examiner* — Alvaro S Laham Bauzo
(74) *Attorney, Agent, or Firm* — IDEA Intellectual Limited; Sam T. Yip

(57) ABSTRACT

A system and a method for classifying and localizing surface defects with a high accuracy rate when only a small number of labeled defect data is available. The method comprises predicting a defect class for an input image using a convolutional neural network (CNN) classification model; and predicting a defect location for the input image via location ensemble with a coarse localization map and an anomaly map, which are generated using the CNN classification model and anomaly detection model respectively. The CNN classification model is built based on a CNN encoder and trained with labeled real defect images. The CNN encoder is trained by multi-task self-supervised learning with real non-defect and synthetic defect images.

10 Claims, 7 Drawing Sheets

(56) References Cited

FOREIGN PATENT DOCUMENTS

| | | | | | |
|---|---|---|---|---|---|
| CN | 114240886 | A | | 3/2022 | |
| CN | 114972334 | A | * | 8/2022 | ............. G06N 3/045 |
| CN | 115170528 | A | | 10/2022 | |
| CN | 115222650 | A | | 10/2022 | |
| CN | 115409822 | A | | 11/2022 | |
| CN | 115526847 | A | | 12/2022 | |
| CN | 115690574 | A | | 2/2023 | |
| KR | 102302341 | B1 | | 9/2021 | |
| KR | 20210141060 | A | * | 11/2021 | ........... G06T 7/0002 |

OTHER PUBLICATIONS

He, "TransFG: A Transformer Architecture for Fine-Grained Recognition", 2022 (Year: 2022).*
Huang, "Registration based Few-Shot Anomaly Detection", 2022 (Year: 2022).*
Bergmann, "Uninformed Students: Student-Teacher Anomaly Detection with Discriminative Latent Embeddings", 2020 (Year: 2020).*
Lin, "Few-Shot Defect Segmentation Leveraging Abundant Normal Training Samples Through Normal Background Regularization and Crop-and-Paste Operation", 2021 (Year: 2021).*
Jezequel, "Efficient Anomaly Detection Using Self-Supervised Multi-Cue Tasks", Jan. 2023 (Year: 2023).*
Lv, "Self-Supervised Surface Defect Detection Methods for Industrial Products", 2022 (Year: 2022).*
He Ju et al., "TransFG: A Transformer Architecture for Fine-Grained Recognition", Proceedings of the AAAI Conference on Artificial Intelligence, Association for the Advancement of Artificial Intelligence, 2022, vol. 36, No. 1, pp. 852-860.
International Search Report and Written Opinion of corresponding PCT application No. PCT/CN2023/076342 mailed on Oct. 7, 2023.
Office Action of corresponding China patent application No. 202380008400.4 mailed on Dec. 25, 2025.

* cited by examiner

SYSTEM AND METHOD FOR DEFECT CLASSIFICATION AND LOCALIZATION WITH SELF-SUPERVISED PRETRAINING

FIELD OF THE INVENTION

The present invention generally relates to deep learning for defect classification. More specifically, the present invention relates to a deep learning method that can achieve high defect classification accuracy with limited labeled defect samples.

BACKGROUND OF THE INVENTION

Defect detection is very important in industrial production, especially in the semiconductor industry. As the technology for designing semiconductor devices advances, the number of manufacturing processes and their complexity increase dramatically, and in turn the probability of occurrence of defects and their impacts to the production chain. In response to this challenge, the industry has started to adopt artificial intelligence (AI) technologies in defect detection.

Machine learning (ML) is an AI technique that provides computer systems the ability to perform tasks, without explicitly being programmed, by making inferences based on patterns found in the analysis of data.

Deep learning is a branch of ML that uses the concept of logical layers to construct algorithms to create "artificial neural networks" that can autonomously learn and make intelligent decisions. It is used to achieve state-of-the-art performance on defect classification and localization.

However, deep learning-based defect classification and localization require a large amount of data for model training. Therefore, the shortcomings include long data collection cycle and the need for costly data annotation (or labeling).

Currently, approaches have been introduced to deal with data shortage problem in deep learning-based defect inspection. U.S. Pat. No. 9,964,607B1 discloses a method for generating synthetic data related to known defect patterns on surfaces of magnetic media using parameterized rules. The method includes training a convolutional neural network (CNN) classifier with the synthetic data so that the classifier learns how to detect and identify defect patterns on magnetic media. However, only a limited performance boost is possible for this approach as only images labeled with defect class can be applied to the modeling.

China Patent Application Publication No. 113643224A discloses a method and a device for defect detection based on semi-supervised learning. In this approach, the model is trained with labeled and unlabeled data together, but the performance is nonetheless unstable because of the assumption of the data.

China Patent Application Publication No. 114240886A discloses a steel picture defect detection method in industrial production. Its classification model is trained with unlabeled data, then finetuned with labeled data. However, a suitably designed pretraining task is required for training the classification model in this approach.

It appears in the current state of the art, the performance of defect inspection with a limited number of labeled sample data is unsatisfactory.

SUMMARY OF THE INVENTION

It is an objective of the present invention to address the aforementioned shortcomings by providing a system and a method for high accuracy in defect classification even with limited labeled defect samples.

In accordance with one aspect of the present invention, a method for classifying and localizing surface defects is provided. The method predicts a defect class for an input image using a CNN classification model and locates the anomaly regions by combining a coarse localization map generated using the CNN classification model and an anomaly map generated using the anomaly detection model via location ensemble. In accordance with another embodiment of the present invention, the system further aligns the input image before performing anomaly detection.

The CNN classification model is built based on a CNN encoder and is finetuned with labeled real defect images. The CNN encoder is trained by multi-task self-supervised learning with real non-defect images and synthetic defect images. The anomaly detection model is built by learning a distribution of the real non-defect images.

In accordance with another aspect of the present invention, a system for performing the aforementioned method for classifying and localizing surface defects is provided. The system comprises an anomaly learning module configured to perform the learning of the anomaly detection model; a self-supervised pretraining module configured to train the CNN encoder by the multi-task self-supervised learning; a finetuning module configured to build and train the CNN classification model; and an inference module configured to perform the prediction of the defect class for the input image, the generation of the coarse localization map for the input image, the generation of the anomaly map for the input image, and the prediction of the defect location in the input image.

BRIEF DESCRIPTION OF THE DRAWINGS

Embodiments of the invention are described in more detail hereinafter with reference to the drawings, in which.

DETAILED DESCRIPTION

In the following description, systems and methods of defects classification and localization, and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with one embodiment of the present invention, a method for classifying and localizing surface defects is provided. The method predicts a defect class for an input image using a CNN classification model and locates anomaly regions by combining a coarse localization map from the CNN classification model and an anomaly map from the anomaly detection model via location ensemble. In accordance with another embodiment of the present invention, the system further aligns the input image before performing anomaly detection.

In accordance with another embodiment of the present invention, an inference module receives an input image for detecting the defect types and locating the defects. The inference module performs an anomaly detection and generates an anomaly map, and defect classification and visualization to output a defect class and a coarse defect localization map. A self-supervised pre-training module performs multi-task learning with non-defect images and synthetic defect images.

Not only the type of defects can be classified, the system also detects and determines the location of the defects on a subject article (i.e., a semiconductor packaging) with high accuracy. It is to be noted that the present invention is not limited in the application on electronic package inspection, other fields and uses are readily applicable with the input of different sample images as training dataset. The following description of the embodiments of the present invention in detecting defects on semiconductor packaging is only for illustrating the inventive concepts and not meant to be limiting examples.

Figure 1:
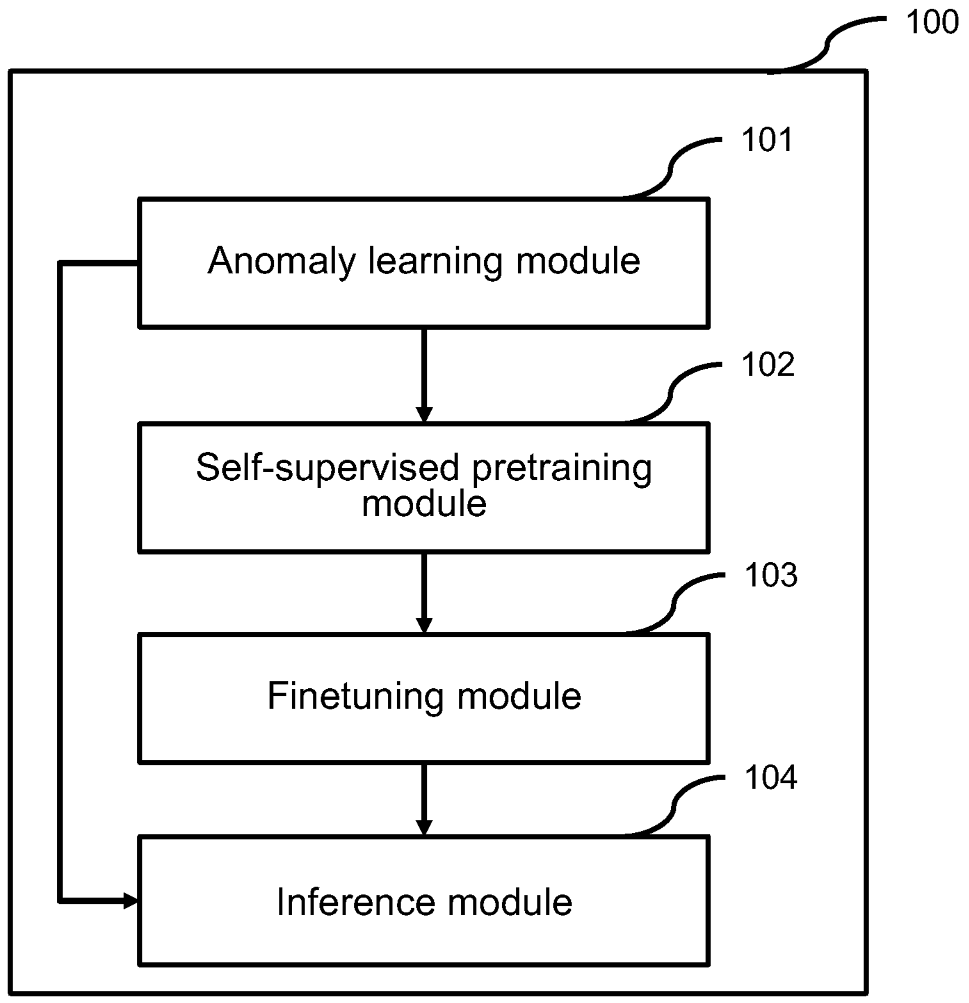
FIG. 1 depicts a dataflow diagram of a system for classifying the type of defects and localizing the defects of an input image with high accuracy in defect classification according to the embodiments of the present invention.

Referring to FIG. 1 for the following description. According to an embodiment of the present invention, the provided system 100 comprises an anomaly learning module 101, a self-supervised pretraining module 102, a finetuning module 103, and an inference module 104. The system is configured to receive a plurality of real images. The real images comprise both non-defect images and defect images. A small number of the real defect images may be labeled with specific defect types.

System 100 is configured to learn an anomaly detection model with the real non-defect images, which is performed by anomaly learning module 101. The anomaly learning module 101 learns a normal distribution of the real non-defect images using the embeddings (feature vectors) extracted from the real non-defect images by an ImageNet pre-trained CNN model. The anomaly detection model then passes to the self-supervised pretraining module 102 to generate synthetic defect images for training a CNN encoder; and to the inference module 104 to output an anomaly map; following the direction of the arrow between the modules as indicated in FIG. 1 for further processes.

System 100 trains the CNN encoder in a self-supervised manner with the real non-defect images and the synthetic defect images. The synthetic defect images are generated using the learned anomaly detection model identifying anomaly regions in the unlabeled real images and overlaying them on the real non-defect images. The CNN encoder is then outputted from the self-supervised pretraining module 102 for building a CNN classification model in the finetuning module 103. System 100 builds the CNN classification model based on the CNN encoder. The CNN classification model is generated from the finetuning module 103 for classifying and localizing defects in inputted images in the inference module 104. The defect class and the defect locations in the inputted images are predicted when deploying the CNN classification model and the anomaly detection model in the inference module 104.

In various embodiments, each module of system 100 comprises at least one processor and at least one non-transitory computer-readable storage medium. The non-transitory computer-readable storage medium stores machine instructions executable by the processor. The machine instructions are used to configure the processor to execute one or more of the processes in accordance with the embodiments of the present invention.

Figure 2:
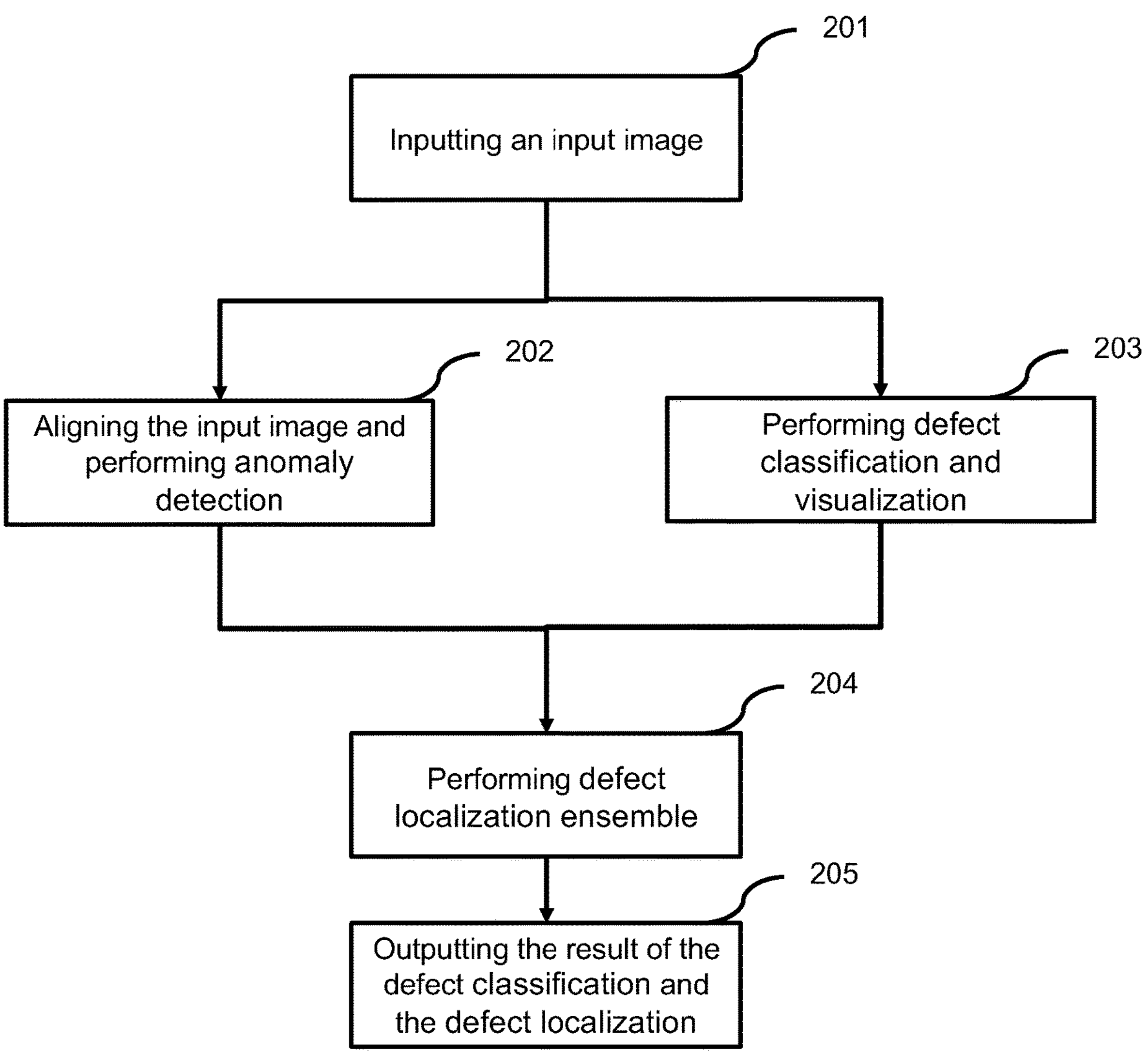
FIG. 2 depicts a process flow diagram of a method for classifying the defect types and locating the anomaly regions of an input image according to the embodiments of the present invention.

FIG. 2 illustrates a method for classifying the defect types and detecting the defect location of an input image according to the embodiments of the present invention. The method is performed by the inference module 104 as illustrated in FIG. 1.

In process 201, the inference module 104 receives an input image for detecting the defect types and the defect locations.

In process 202, the inference module 104 performs image alignment and then anomaly detection to indicate if there is any defect in the input image. The image alignment is performed by transforming a main part of the input image to match a pre-selected golden sample. The input image is then divided into a plurality of input image patches. By extracting the patch embeddings of the input image patches with an ImageNet pre-trained CNN model and comparing them with the normal distribution of the real non-defect image patches, which are divided from the real non-defect image, the inference module 104 determines whether the input image is a defect image or not, and an anomaly map is generated.

To generate the anomaly map, Mahalanobis distance is introduced. The Mahalanobis distance may be interpreted as the distance between a point ($x_{ij}$) and a distribution. The Mahalanobis distance M ($x_{ij}$) is computed as follows:

$$M(x_{ij}) = \sqrt{(x_{ij} - \mu_{ij})^T \sum_{ij}^{-1} (x_{ij} - \mu_{ij})}$$

Mahalanobis distance is computed for the patch (x) in position (i, j) of the input image as an anomaly score, which is used to judge and indicate whether the patch is an anomaly or not.

In one embodiment, a higher anomaly score represents that the region is more likely an anomaly.

In an alternative embodiment, image alignment may not be performed before anomaly detection in process 202. However, it is preferable to perform image alignment to reduce the variance between the images.

In process 203, the inference module 104 performs the defect classification and visualization. To perform the defect classification, the inference module 104 may identify the defect types of the inputted image from a set of pre-defined defect types with the finetuned CNN classification model generated from the finetuning module 103. In the visualization, the gradient-weighted class activation mapping (Grad-CAM) algorithm is applied for coarse defect localization. The Grad-CAM algorithm tries to infer the areas that are mostly responsible for the classification decision, i.e., the anomaly regions. A coarse localization map (or defect visualization heat map) is generated to highlight the anomaly regions, by using the gradient information flowing into the final convolutional layer of the CNN classification model generated from the finetuning module 103.

In one preferred embodiment, the anomaly detection in process 202 is performed concurrently with the defect classification and visualization in process 203.

In another embodiment, the anomaly detection in process 202 is performed before the defect classification and visualization in process 203.

In yet another embodiment, the anomaly detection in process 202 is performed after the defect classification and visualization in process 203.

In process 204, the inference module generates the defect location ensemble by combining the anomaly map and the coarse localization map generated in process 202 and process 203 respectively.

In one embodiment, the coarse localization map and the anomaly map is combined by taking the weighted sum for both the coarse localization map and the anomaly map, and applying a binary threshold to obtain the final defect location.

In process 205, the inference module outputs the prediction result of the defect classification and the defect localization.

Figure 3:
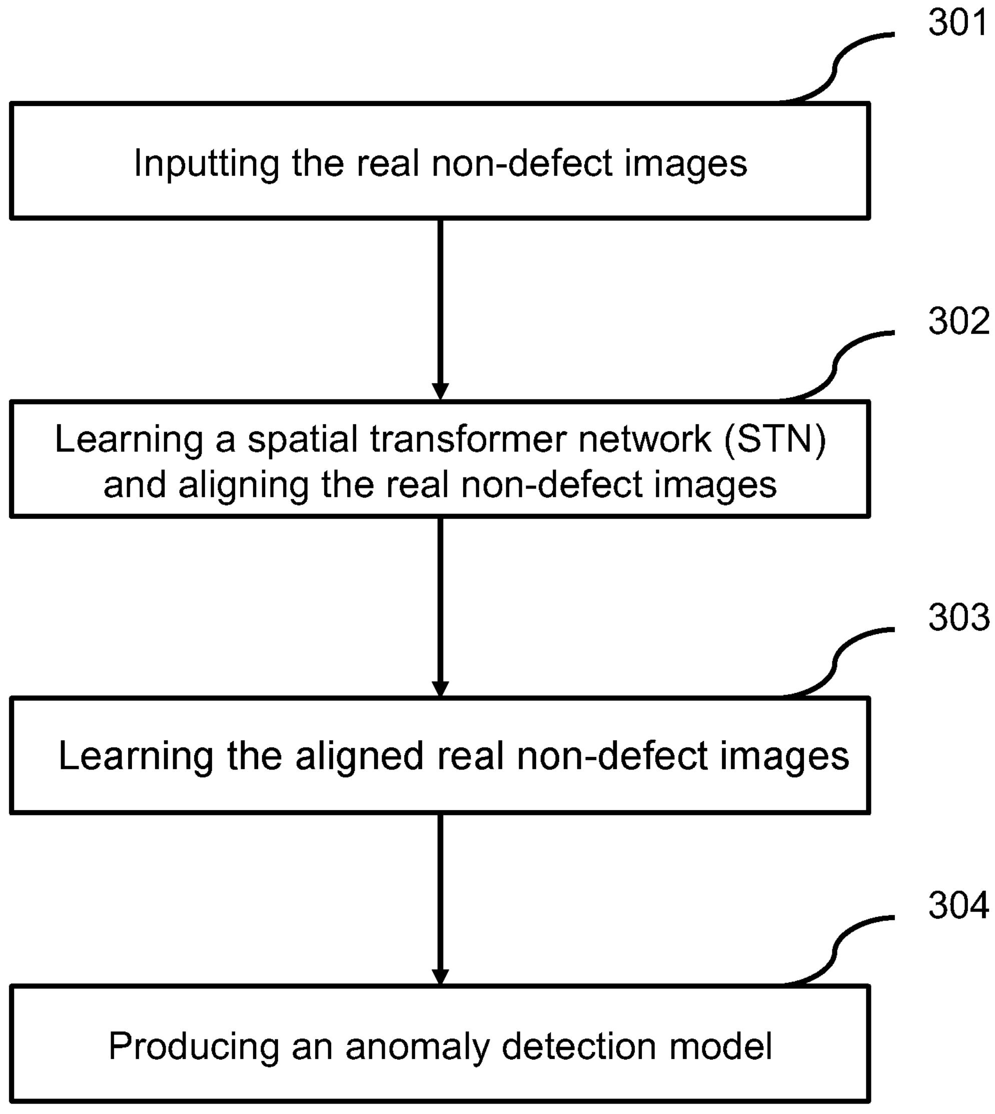
FIG. 3 depicts a process flow diagram of a method for building an anomaly learning model according to the embodiments of the present invention.

FIG. 3 illustrates a method for learning an anomaly detection model according to the embodiments of the present invention. In accordance with one embodiment, the method is performed by the anomaly learning module 101 as illustrated in FIG. 1. The anomaly learning module 101 learns a normal distribution through the real non-defect images to detect anomalies. As such, images with defect labels are not required for learning an anomaly detection model.

In process 301, anomaly learning module 101 receives the real non-defect images.

In process 302, a Spatial Transformer Network (STN) is trained with the real non-defect images for image alignment. The STN is a small CNN comprising two convolution layers learned to transform the main part of the real non-defect images to match a pre-selected golden sample.

By performing the image alignment, the variance between the images is reduced, making it easier for the outliers to be detected. There is no limitation on the algorithm used for image alignment. Any algorithm that can reduce the variance between images may be applied for performing the image alignment.

In an alternative embodiment, the image alignment may not be performed in process 302. However, it is preferable to perform the image alignment to reduce the variance between the images.

In process 303, the anomaly learning module 101 learns from the real non-defect images to generate an anomaly detection model in process 304. When anomaly detection is required, the anomaly detection model is used for producing an anomaly map for an input image to indicate the probability of a defect at a certain location in the input image. In one embodiment, a framework, patch distribution modeling (PaDiM), is introduced for modeling and generating the anomaly map. The PaDiM is capable of detecting and localizing anomalies in images in one-class learning setting concurrently. By applying the PaDiM, the anomaly learning module 101 employs an ImageNet pre-trained CNN model for extracting the patch embeddings (feature vectors) of the real non-defect image patches. A multivariate normal distribution is used to describe the patch embedding of a patch, which is estimated from the patch embeddings of the real non-defect image patches. The PaDiM described herein is for illustrative purposes only, an ordinarily skilled person in the art will appreciated other methods, such as PatchCore, and CFlow-AD, may also be used for the modeling and generation of the anomaly map.

Figure 4:
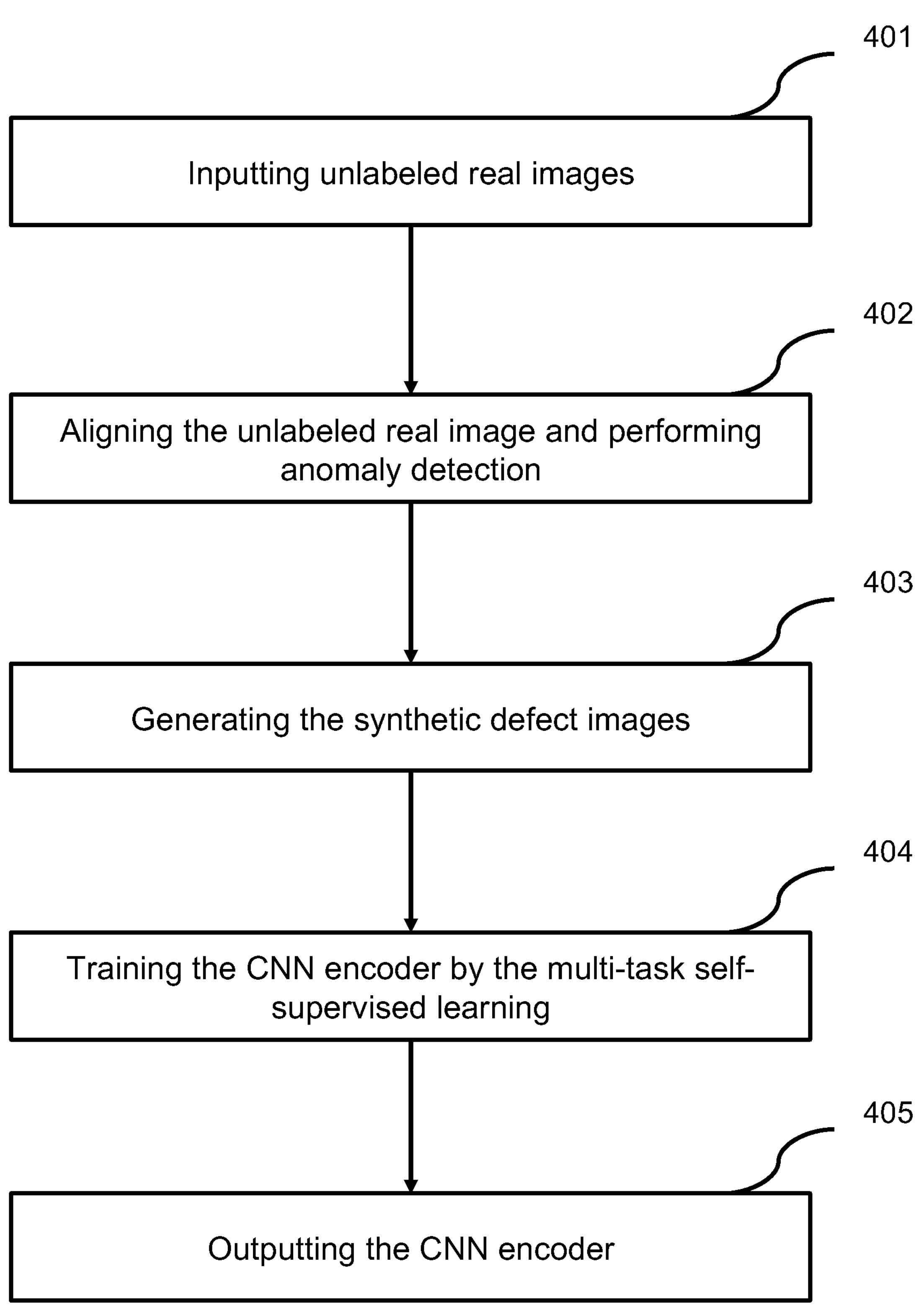
FIG. 4 depicts a process flow diagram of a method for training the CNN encoder according to the embodiments of the present invention.

FIG. 4 illustrates a method for training the CNN encoder according to the embodiments of the present invention. The method is performed by the self-supervised pretraining module 102 as illustrated in FIG. 1.

In process 401, the self-supervised pre-training module 102 receives the unlabeled real images. The unlabeled real images comprise one or more real images with defects and one or more real images without any defect.

In process 402, the self-supervised pre-training module 102 performs the image alignment first, then the anomaly detection for detecting anomalies among the unlabeled real images.

In an alternative embodiment, the image alignment may not be performed in process 402. However, it is preferable to perform the image alignment to reduce the variance between the images.

In process 403, the self-supervised pre-training module 102 generates synthetic defect images by using the detected anomalies in the unlabeled real images. A detected anomaly region is overlaid on a real non-defect image to generate a synthetic defect image.

In process 404, the CNN encoder is trained by multi-task self-supervised learning with the real non-defect images and the synthetic defect images. In one embodiment, the multi-task self-supervised learning comprises two learning tasks, which are a binary classification task and a contrastive learning task.

The binary classification task is to classify the real non-defect images and the synthetic defect images using the output of the CNN encoder. A classification head outputs the probabilities of an image belonging to each class (defect or non-defect), which is then used to calculate the cross-entropy loss. The classification head is a linear layer of a neural network.

On the other hand, the contrastive learning task aims to separate the defect class from non-defect class further by learning an embedding space in which similar pairs (defect pairs or non-defect pairs) are close to each other, while dissimilar pairs (defect and non-defect pairs) are further apart from each other. This embedding space improves the performance of downstream tasks such as the multiclass defect classification in process 203. A contrastive head calculates the contrastive loss. The contrastive head is a multilayer perceptron (MLP) with ReLU activation. Both the classification head and the contrastive head are attached at the end of the CNN encoder for the multi-task self-supervised learning. The total loss to be minimized during training is the weighted sum of the individual losses for the classification head and the contrastive head respectively.

In one embodiment, the cross-entropy loss ($L_{cross}$) is calculated by the following equation:

$$L_{cross} = -\frac{1}{N}\sum_{i=1}^{N}\sum_{c=1}^{C} y_{i,c}\log(p_{i,c})$$

Where y is the target, p is the Softmaxed probability of the model output, N is the number of samples, and Cis the number of classes.

In one embodiment, the contrastive loss ($L_{con}$), as taken from TransFG (as described in Ju He et al., *TransFG: A*

*Transformer Architecture for Fine-grained Recognition*, arXiv preprint arXiv:2103.07976, 2021; the disclosure of which is incorporated herein by reference in its entirety), is calculated by the following equation:

$$L_{con} = \frac{1}{N^2}\left(\sum_{j:y_i=y_j}^{N}(1 - sim(z_i, z_j)) + \sum_{j:y_i\neq y_j}^{N}\max(sim(z_i, z_j) - \alpha, 0)\right)$$

Where $z_i$, $z_j$ are the embedding of the image pair i and j, y is the target label (defect or non-defect class), sim(·) is cosine similarity, a is a threshold for selecting only the highly similar negative pairs to contribute to the contrastive loss, and N is the number of samples. By minimizing the contrastive loss, the model tries to learn an embedding space such that the embeddings of the images with the same label $y_i = y_j$ (defect pairs or non-defect pairs) have high similarity, while the embeddings of the images with different label $y_i \neq y_j$ (defect and non-defect pairs) have low similarity.

In process 405, the CNN encoder is outputted. The CNN encoder is then used for building the classification model in a finetuning process by the finetuning module 103.

Figure 5:
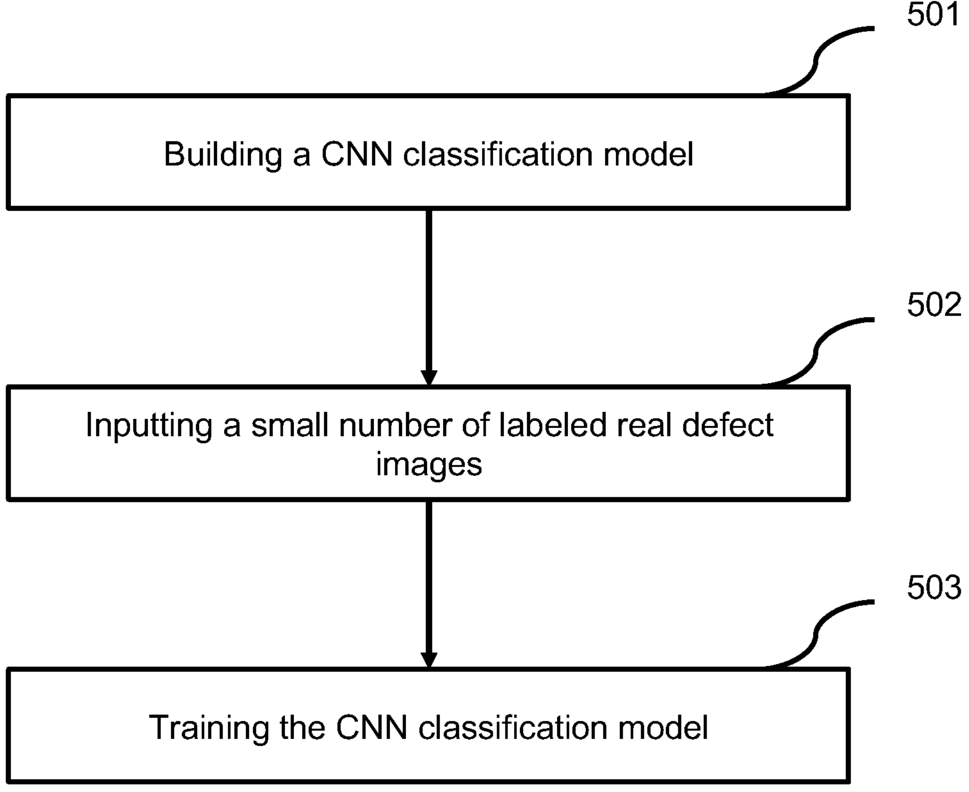
FIG. 5 depicts a process flow diagram of a method for building and training a CNN classification model according to the embodiments of the present invention.

FIG. 5 illustrates a method for building and training the CNN classification model according to the various embodiments of the present invention. The method is performed by the finetuning module 103 as illustrated in FIG. 1.

In process 501, the CNN classification model is built by adding a linear classifier to the CNN encoder. The linear classifier may be a randomly initialized linear classifier.

In process 502, a small number of labeled real defect images are inputted for training the CNN classification model. In one example, the number of labeled real defect images required by the embodiments of the present invention is 3,100, which is approximately 50% of the number of labeled defect samples required by other commonly available deep learning approaches.

In process 503, the CNN classification model is trained with the small number of labeled real defect images inputted in process 502. In this process, the CNN encoder and linear classifier are finetuned to adapt to the target defect classification task (i.e., electronic package defect classification).

Figure 6:
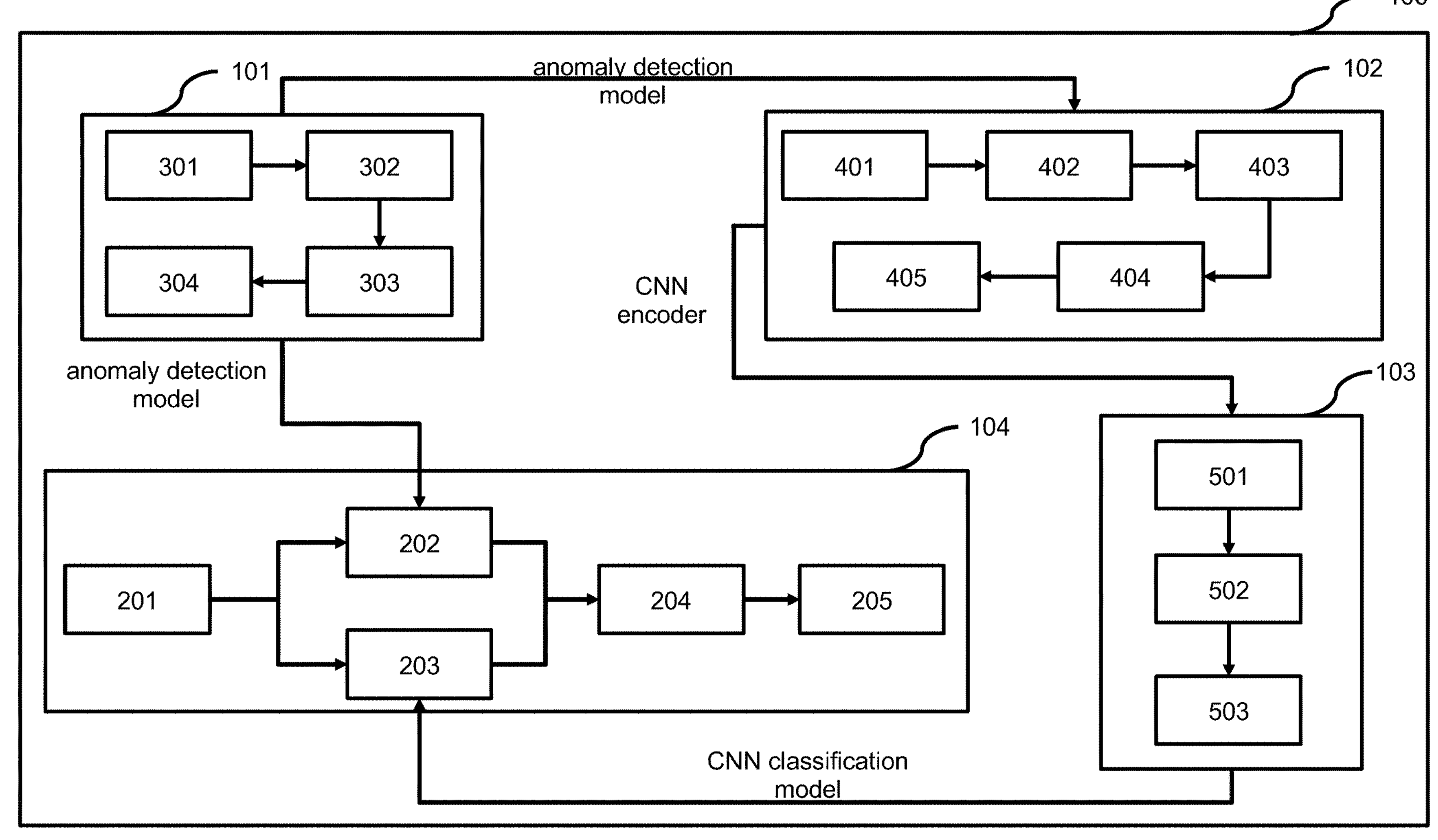
FIG. 6 depicts an overall schematic diagram of system 100 according to the various embodiments of the present invention.

FIG. 6 depicts an overall schematic diagram of the system 100 according to the embodiment of the present invention. Same as the illustration depicted in FIG. 1, shown in FIG. 6 is that the system 100 comprises the anomaly learning module 101, the self-supervised pretraining module 102, the finetuning module 103, and the inference module 104. The anomaly detection model is learned and generated by performing process 301-304 illustrated in FIG. 3 by the anomaly learning module 101 of the system 100. The anomaly detection model is further transmitted to the self-supervised pretraining module 102 and the inference module 104 for performing the anomaly detection respectively. The CNN encoder is trained by performing process 401-405 illustrated in FIG. 4 by the self-supervised pretraining module 102 of the system 100. The trained CNN encoder is further transmitted to the finetuning module 103 for training the CNN classification model. The CNN classification model is trained by performing the process 501-503 illustrated in FIG. 5 by the finetuning module 103 of the system 100. The trained CNN classification model is further transmitted to the inference module 104 for performing defect classification and visualization. Process 201-205 illustrated in FIG. 2 is performed by the inference module 104 of the system 100 for defect classification and localization and output the defect class and location.

Figures 7A, 7B:
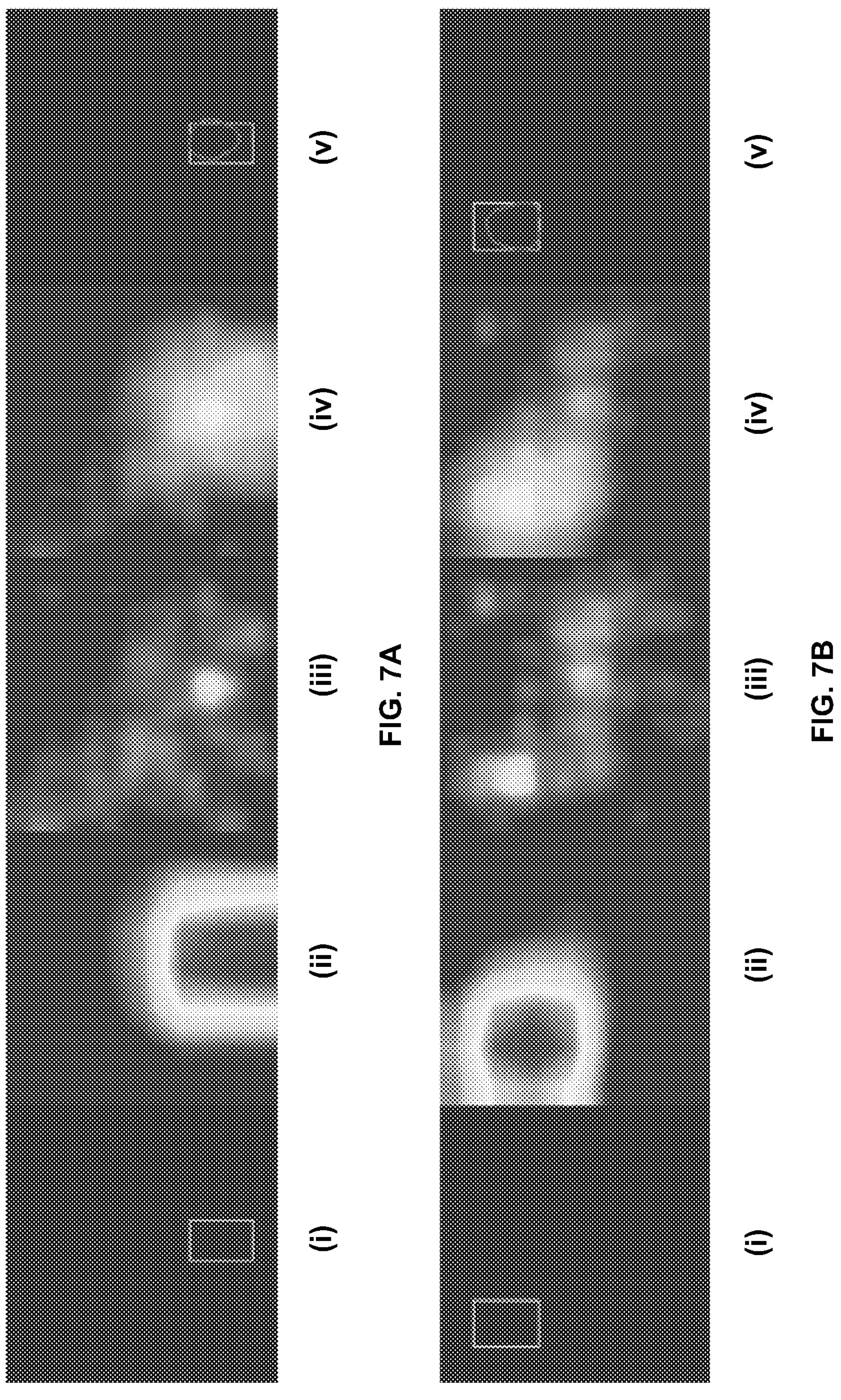
FIGS. 7A and 7B depict the sets of maps or images generated from different input sample images during the method processes in accordance with an embodiment of the present invention.

FIGS. 7A and 7B illustrate the sets of maps or images generated from two input sample images with image details removed for clearer illustrations of the results.

FIG. 7A (i) and FIG. 7B (i) illustrate the real defect locations indicated by bounding boxes in the two input sample images.

FIG. 7A (ii) and FIG. 7B (ii) illustrate two coarse localization maps generated according to the embodiments of the present invention. Each of them visualizes the defect in a visual annotation form according to the pixel values of the respective image. The visual annotations include color codes in the form of a heat map, shaded indicators, or other types of visual annotations. In the figures, the portions of the defect center are highlighted with red color, and the anomaly regions leading away from the defect center transition from orange, yellow, green, and blue.

FIG. 7A (iii) and FIG. 7B (iii) illustrate two anomaly maps generated according to the embodiments of the present invention. Each of them is generated by the inference module in process 202.

FIG. 7A (iv) and FIG. 7B (iv) illustrate two defect location ensembles generated according to the embodiments of the present invention. By taking a weighted sum of the coarse localization map generated in process 203 and the anomaly map generated in process 202 respectively, the defect location ensembles illustrated in FIG. 7A (iv) and FIG. 7B (iv) are obtained.

FIG. 7A (v) and FIG. 7B (v) illustrate two location prediction results according to the embodiment of the present invention. The location prediction results are obtained by applying binary threshold on the location ensembles. As illustrated in FIG. 7A (v) and FIG. 7B (v), the region within the red line indicates the two location prediction results respectively.

According to the results from an experiment, the average class accuracy rate is 71.22 percent by applying an embodiment of the present invention, which is higher than those of other techniques, such as data augmentation (with the average class accuracy rate of 65.89 percent), Semi-supervised learning (UDA) (with the average class accuracy rate of 64.54 percent), and Contrastive self-supervised learning (SimCLR) (with the average class accuracy rate of 68.22 percent).

The functional units and modules of the systems, and/or methods in accordance with the embodiments disclosed herein may be implemented using computing devices, computer processors, or electronic circuitries including but not limited to application-specific integrated circuits (ASIC), field programmable gate arrays (FPGA), and other programmable logic devices configured or programmed according to the teachings of the present disclosure. Computer instructions or software codes running in computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, and mobile computing devices such as smartphones and tablet computers.

Each of the functional units and modules in accordance with various embodiments also may be implemented in distributed computing environments and/or Cloud computing environments, wherein the whole or portions of machine instructions are executed in a distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for classifying and localizing surface defects for a target defect classification task with limited number of labeled real defect images as training data to classification model used, comprising:

predicting a defect class for an input image using a convolutional neural network (CNN) classification model;

generating a coarse localization map for the input image using the CNN classification model to highlight one or more anomaly regions in the input image by using gradient information flowing into a final convolutional layer of the CNN classification model's neural network;

aligning the input image before generating an anomaly map, comprising:

transforming, by a Spatial Transformer Network (STN), a main part of the input image to match a pre-selected golden sample so to reduce variance between the input image and pre-selected golden sample for easing detection of outliers in the input image;

wherein the STN is trained with the real non-defect images for image alignment;

generating the anomaly map for the input image using an anomaly detection model, wherein the anomaly map contains an indication of probability of defect at each of one or more locations in the input image;

predicting a defect location in the input image via location ensemble using the coarse localization map and the anomaly map for enhancing prediction accuracy, comprising:

taking a weighted sum of the coarse localization map generated by the CNN classification model and the anomaly map generated by the anomaly detection model to obtain an intermediate defect location map; and applying a binary threshold to the intermediate defect location map to obtain the final defect location; and outputting the defect class and the defect location for the target defect classification task;

wherein the CNN classification model is built based on a CNN encoder and is finetuned with one or more labeled real defect images for the target defect classification task;

wherein the CNN encoder is trained by multi-task self-supervised learning with one or more real non-defect images and one or more synthetic defect images;

wherein number of the labeled real defect images is significantly fewer than number of the real non-defect images;

wherein the anomaly detection model is built by learning a normal distribution of the real non-defect images, comprising;

dividing the real non-defect images into real non-defect image patches;

extracting real non-defect image patch embeddings from the real non-defect image patches; and estimating the normal distribution of the real non-defect images from the real non-defect image patch embeddings: and wherein anomaly detection model comprises:

dividing the input image into input image patches;

extracting input image patch embeddings from the input image patches; and comparing the input image patch embeddings with the normal distribution of the real non-defect images to determine the probability of defect at each of the one or more locations in the input image.

2. The method of claim 1, wherein the synthetic defect images are generated using the anomaly detection model identifying one or more anomaly regions in one or more unlabeled real images and overlaying the anomaly regions on the real non-defect images.

3. The method of claim 1, wherein the CNN classification model is built and trained by:

adding the CNN encoder with a randomly initialized linear classifier; and finetuning the CNN classification model with the labeled real defect images.

4. The method of claim 1, wherein the multi-task self-supervised learning comprises:

performing a binary classification task with the real non-defect and the synthetic defect images using a classification head to calculate a cross-entropy loss;

performing a contrastive learning task with the real non-defect and the synthetic defect images using a contrastive head to calculate a contrastive loss; and updating the weights of the CNN encoder and two heads to minimize a weighted sum of the cross-entropy loss and the contrastive loss.

5. A system for classifying and localizing surface defects for a target defect classification task with limited number of labeled real defect images as training data to classification model used, comprising:

an anomaly learning module having at least one processor configured to perform a learning of an anomaly detection model;

a self-supervised pretraining module having at least one processor configured to perform multi-task self-supervised learning to train a CNN encoder;

a finetuning module having at least one processor configured to build and train a convolutional neural network (CNN) classification model; and an inference module having at least one processor configured to perform:

predicting a defect class for an input image using the CNN classification model;

generating a coarse localization map for the input image using the CNN classification model by using gradient information flowing into a final convolutional layer of the CNN classification model's neural network, wherein the coarse localization map highlights one or more anomaly regions in the input image;

align the input image before generating an anomaly map, the alignment comprising:

transforming, by a Spatial Transformer Network (STN), a main part of the input image to match a pre-selected golden sample so to reduce variance between the input image and pre-selected golden sample for easing detection of outliers in the input image;

wherein the STN is trained with the real non-defect images for image alignment;

generating the anomaly map for the input image using the anomaly detection model, wherein the anomaly map contains an indication of probability of defect at each of one or more locations in the input image; and predicting a defect location in the input image via location ensemble using the coarse localization map and the anomaly map for enhancing prediction accuracy, comprising:

taking a weighted sum of the coarse localization map generated by the CNN classification model and the anomaly map generated by the anomaly detection model to obtain an intermediate defect location map:

and applying a binary threshold to the intermediate defect location map to obtain the final defect location;

wherein the CNN classification model is built based on a CNN encoder and is finetuned with one or more labeled real defect images for the target defect classification task;

wherein the CNN encoder is trained by the multi-task self-supervised learning with one or more real non-defect images and one or more synthetic defect images;

wherein number of the labeled real defect images is significantly fewer than number of the real non-defect images;

wherein the anomaly detection model is built by learning a normal distribution of the real non-defect images, comprising:

dividing the real non-defect images into real non-defect image patches;

extracting real non-defect image patch embeddings from the real non-defect image patches; and estimating the normal distribution of the real non-defect images from the real non-defect image patch embeddings; and wherein anomaly detection model comprises:

dividing the input image into input image patches;

extracting input image patch embeddings from the input image patches; and comparing the input image patch embeddings with the normal distribution of the real non-defect images to determine the probability of defect at each of the one or more locations in the input image.

6. The system of claim 5, wherein the synthetic defect images are generated using the anomaly detection model identifying one or more anomaly regions in one or more unlabeled real images and overlaying the anomaly regions on the real non-defect images.

7. The system of claim 5, wherein at least one processing unit of the finetuning module further performs the following for building and training the CNN classification model:

adding the CNN encoder with a randomly initialized linear classifier; and finetuning the CNN classification model with the labeled real defect images.

8. The system of claim 5, wherein the multi-task self-supervised learning comprises:

performing a binary classification task with the real non-defect and the synthetic defect images using a classification head to calculate a cross-entropy loss;

performing a contrastive learning task with the real non-defect and the synthetic defect images using a contrastive head to calculate a contrastive loss; and updating the weights of the CNN encoder and two heads to minimize a weighted sum of the cross-entropy loss and the contrastive loss.

9. The method of claim 1, wherein the target defect classification task is semiconductor packaging defect detection.

10. The system of claim 5, wherein the target defect classification task is semiconductor packaging defect detection.

* * * * *